June 29, 1926.  E. G. STAUDE ET AL  1,590,453
COMBINED VEHICLE AND TRACTION MACHINE
Filed June 24, 1916    2 Sheets-Sheet 2

INVENTORS
EDWIN G. STAUDE
VITUS A. BOKER

Patented June 29, 1926.

1,590,453

UNITED STATES PATENT OFFICE.

EDWIN G. STAUDE AND VITUS A. BOKER, OF MINNEAPOLIS, MINNESOTA, ASSIGNORS TO E. G. STAUDE MANUFACTURING CO., OF ST. PAUL, MINNESOTA, A CORPORATION.

COMBINED VEHICLE AND TRACTION MACHINE.

Application filed June 24, 1916. Serial No. 105,716.

The object of our invention is to provide a traction attachment by means of which the farmer or other person can easily and quickly convert his automobile from a vehicle to a tractor or vice versa.

A further object is to provide an attachment which will not require any material change in the structure of the vehicle to adapt it for use as a tractor.

Other objects of the invention will appear from the following detailed description.

The invention consists generally in various constructions and combinations, all as hereinafter described and particularly pointed out in the claims.

Figure 1:
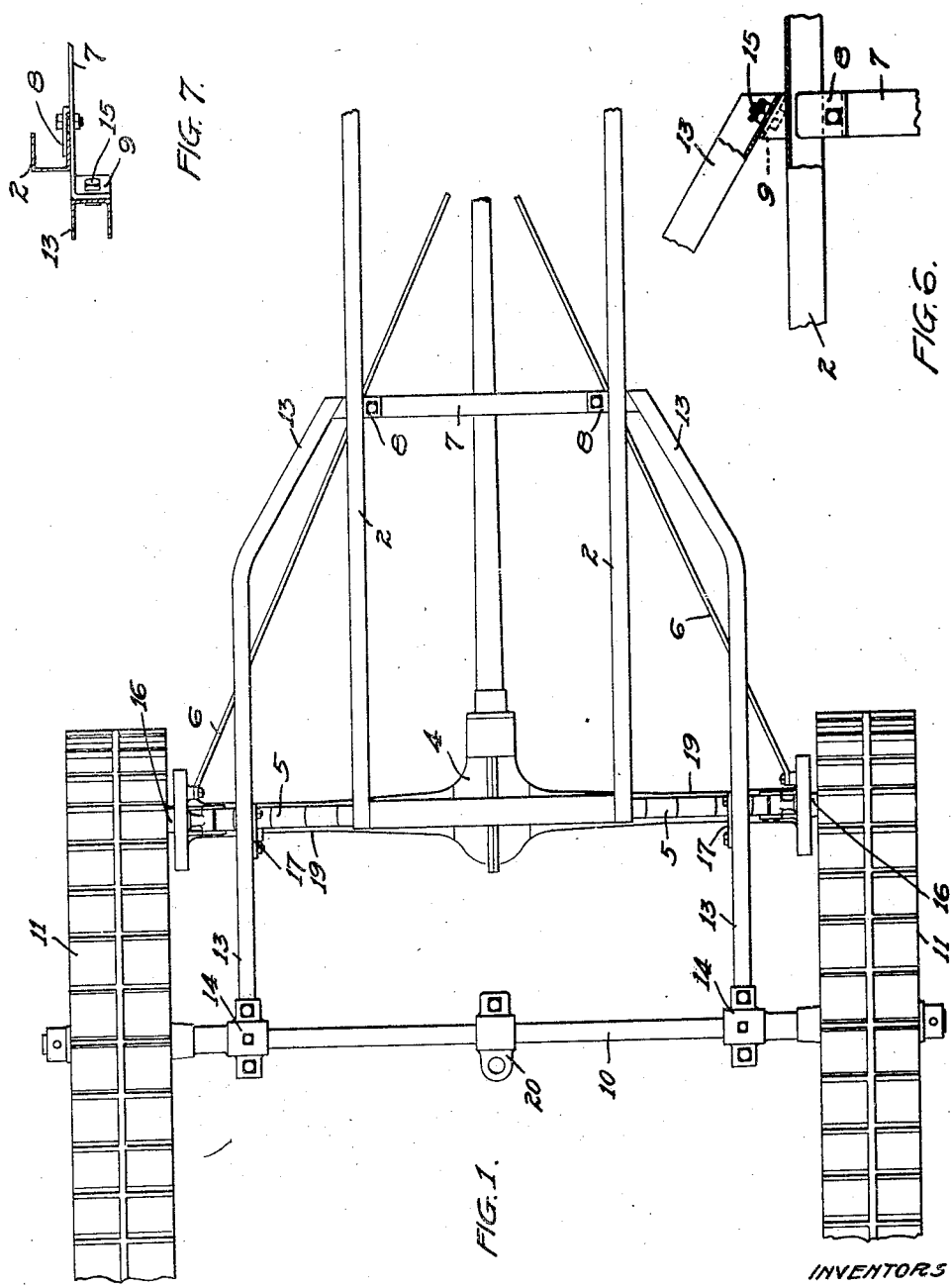
Figure 2:
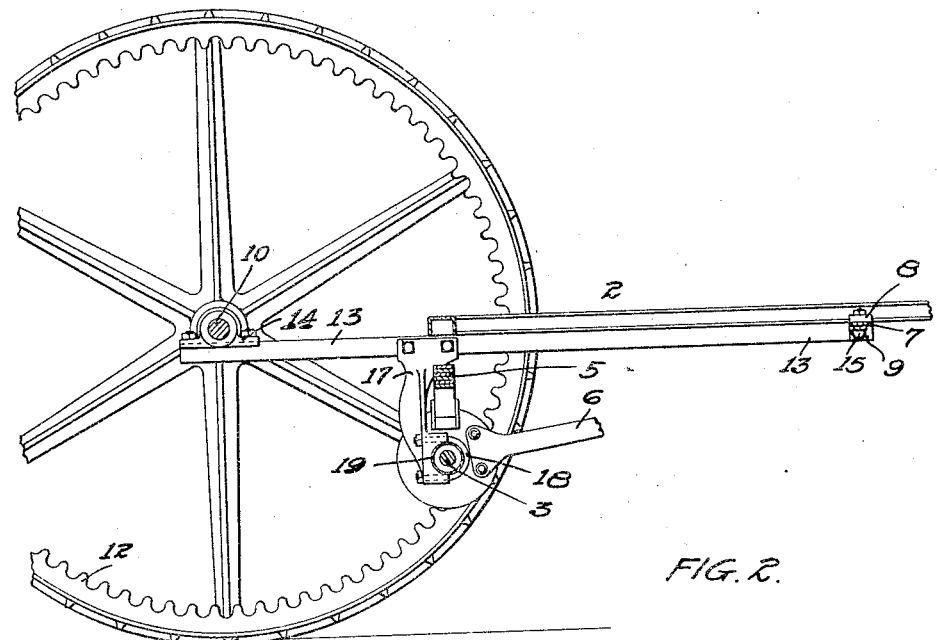
Figures 3, 4, 5:
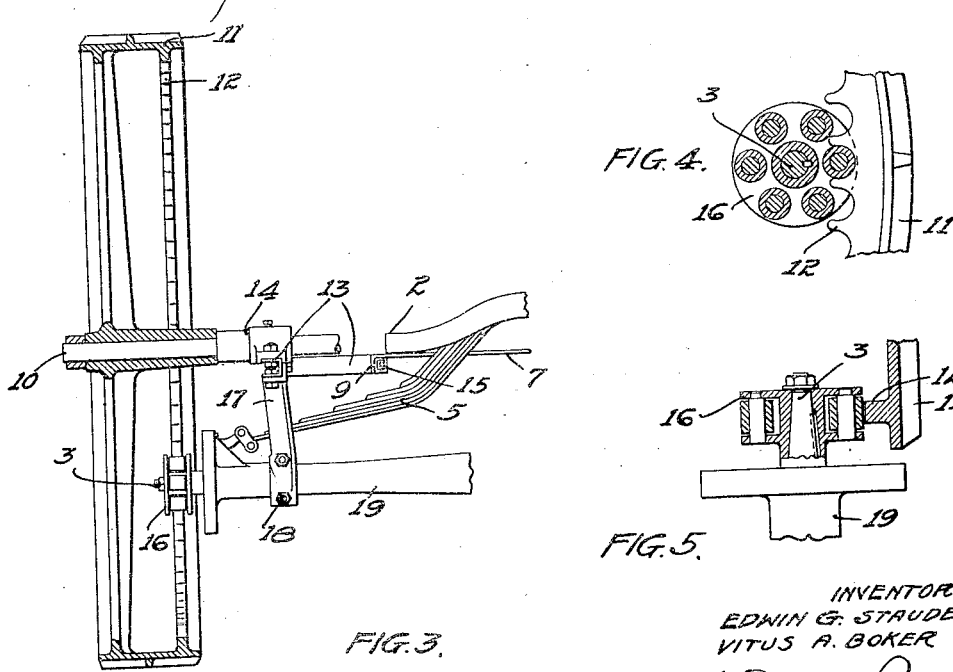

In the accompanying drawings forming part of this specification,

Figure 1 is a plan view of the rear portion of the frame of a vehicle, with our improved tractor attachment applied thereto, Figure 2 is a vertical sectional view of the same, showing the means for securing the rear axle of the vehicle to the frame of the attachment, Figure 3 is a rear view of the same with the traction wheel in section, illustrating the position of the driving pinion on the axle of the vehicle.

Figures 4 and 5 are detail views in section of the manner of mounting a driving pinion on the vehicle axle and its engagement with the teeth of the traction wheel, Figure 6 is a detail view showing the preferred means for attaching the tractor frame to the frame of the vehicle, Figure 7 is a detail sectional view of the same.

In the drawing, 2 represents the frame of the automobile, of channel bar construction preferably, having the usual rear axle 3, casing 4 for the differential, spring 5 and rod 6 connecting the ends of the axle with the forward portion of the frame. To this frame we add a cross bar 7 secured at each end by clips 8 to the channel bar rails of the frame. This bar has downwardly turned ends 9 on each side of the parallel rails. 10 represents the axle of the tractor, provided with traction wheels 11 having an internal driving gear 12. The bars 13, also preferably of channel bar, are secured at their rear ends in boxes 14 on the axle 10 and project forwardly therefrom and have inwardly turned forward ends seated against the ends 9 and pivotally connected thereto by bolts 15.

Upon removing these bolts, the tractor attachment may be separated from the frame of the vehicle. Generally, however, these auxiliary bars or rails will be left permanently on the frame of the car, the traction wheels' axle being detached therefrom whenever it is desired to use the machine as a pleasure vehicle.

Pinions 16, preferably of the lantern type, having anti-friction rollers, are mounted on the spindles of the axle 3, the ordinary carrying wheels of this axle being removed preparatory to the use of the apparatus as a tractor.

When the parts are assembled, the pinions will be in position to engage the teeth of the gear 12 and mesh therewith for driving the traction wheels. Hangers 17 are secured to the bars 13 above the axle 3 and have couplings 18 at their lower ends by means of which the hangers are mounted on the axle housing or sleeve 19 with freedom of oscillation thereon to allow the frame of the machine to oscillate and the spring 5 to yield under the weight of the load on the machine or when it is passing over rough ground. At such time the rear of the frame will rock on the axle 10, the pivotal connections of the bars 13 at their forward ends allowing such movement, and as the bars descend against the tension of the spring 5, the hangers 17 will oscillate sufficiently to permit such downward movement and allow the spring 5 to be utilized. We thus provide a flexible frame for use either with a pleasure vehicle or tractor. By having the main and auxiliary frames positioned at a substantial distance above the rear axle 3 by the hangers 17 a greater clearance is left between the frames and the ground than would be if said frames were below or substantially on the horizontal plane of axle 3 and thus greater freedom of vertical movement of the frames permitted in going over hilly ground with the tractor without striking the ground beneath the sides of the frames.

The middle portion of the axle 10 may be provided with a draft connection 20. To attach the traction wheels to the machine in place of the ordinary wheels with pneumatic tires, it is only necessary to remove the vehicle rear wheels and substitute in place thereof the driving pinions, adjust the traction wheels in positions so that their pinions will mesh with the gears of the traction wheels, and then mount the axle 10 on the bars 13, the hangers remaining permanently on the rear axle housing and supporting the rear portions of the bars 13. By providing a construction which allows us to leave the auxiliary frame and its connections on the automobile frame permanently, we are able to greatly simplify the operation of transposing the parts to adapt the machine for use as a vehicle or a tractor.

The function of the spring 5 is not interfered with by leaving the auxiliary frame on the machine, and the additional parts are not at all unsightly when the machine is used as a pleasure vehicle. To make the change from one machine to the other, it is only necessary to jack up the rear portion of the frame, remove the rear wheels of the car and secure the axle 10 to the bars 13. By reversing this operation, the apparatus can be readily changed from a tractor to an automobile. In this way a farmer owning a small car used generally for pleasure purposes, can easily and quickly adapt it for use in the field or on the road as a tractor.

We claim as our invention:

1. The combination, with a vehicle frame having a power-driven rear axle and driving pinions for mounting on the spindles of said axle in place of the carrying wheels, of an auxiliary frame having a flexible connection permitting movement in a vertical plane of one frame relatively to the other at its forward end with said vehicle frame and its rear portion supported by said axle for freedom of movement of said vehicle frame relatively to the auxiliary frame to adapt the machine for use as a pleasure vehicle without removing the auxiliary frame, and a traction axle mounted on said auxiliary frame and having traction wheels provided with gears for meshing with said pinions.

2. The combination, with a vehicle frame having a power driven rear axle and driving pinions for mounting on the spindles of said axle in place of carrying wheels and a spring supporting said frame on said rear axle, of an auxiliary frame having a hinged connection with said vehicle frame in front of said axle to permit movement in a vertical plane and supported on said rear axle by an oscillating hanger, said vehicle frame having freedom of movement with said spring and the connections of said auxiliary frame with said vehicle frame and axle providing a flexible support for the vehicle body when used as a vehicle or a tractor, a traction axle mounted on said auxiliary frame, and traction wheels for said traction axle having gears to mesh with said driving pinions.

3. The combination, with a vehicle frame having a power driven rear axle and driving pinions for mounting on the spindles of said axle in place of the carrying wheels, of an auxiliary frame having a flexible connection at its forward end with said vehicle frame, hangers depending from the rear portion of said auxiliary frame and supported on said rear axle for oscillation thereon, a spring interposed between said rear axle and said main frame, a traction axle journaled on the rear portion of said auxiliary frame, traction wheels therefor having gears meshing with said driving pinions, the connections of said vehicle frame and said auxiliary frame with said axles providing a relative movement of said frame and forming a flexible support for a vehicle body.

4. The combination, with a vehicle frame having a power driven rear axle and driving pinions for mounting on the spindles of said axle in place of the carrying wheels, of an auxiliary frame having a flexible connection at its forward end with said vehicle frame, hangers secured at their upper ends to the rear portion of said auxiliary frame and coupled at their lower ends to said rear axle for oscillation thereon, a spring supporting the rear portion of said vehicle frame on said axle, a traction axle journaled on said auxiliary frame, and traction wheels therefor having gears meshing with said driving pinions.

5. The combination, with a vehicle frame having a power driven rear axle and driving pinions for mounting on the spindles of said axle in place of the carrying wheels and clamps secured to said frame in front of said axle, of an auxiliary frame having a pivotal connection with said clamps to permit movement in a vertical plane and extending rearwardly therefrom and having supports which extend above said axle, the rear portion of said vehicle frame being carried by said axle between the side rails of said auxiliary frame, and said vehicle frame and auxiliary frame having freedom of oscillation on said axle, a traction axle journaled on the rear portion of said auxiliary frame and traction wheels therefor having gears in mesh with said driving pinions.

6. The combination, with a vehicle frame having a power driven rear axle and driving pinions for mounting on the spindles of said axles in place of the carrying wheels, said vehicle frame including channel bar side rails, of an auxiliary frame having channel bar side rails projecting in front of said rear axle, angle plates seated against the flanges of said vehicle frame side rails and against said auxiliary frame rails, means for pivotally clamping said frames together through said plates for relative movement of said frames, the rear portion of said auxiliary frame rails having supports on said rear axle, and a traction axle mounted on said auxiliary frame and having traction wheels meshing with said pinions.

7. The combination, with a vehicle frame having a power driven rear axle and driving pinions for mounting on the spindles of said axle in place of carrying wheels, said frame including side rails having their rear portions spring-supported on said axle, of an auxiliary frame comprising side bars having their middle portions supported on said rear axle upon each side of said main frame and their forward ends pivotally connected with the side rails of said frame for relative oscillation of one frame in relation to the other, a traction axle having bearings on said auxiliary frame in the rear of said power driven axle, traction wheels mounted on said traction axle and having gears meshing with said pinions, said vehicle frame and said auxiliary frame having freedom of oscillation one relatively to the other under load when said traction axle and wheels are mounted on said auxiliary frame or when removed therefrom.

8. The combination, with a main frame, a rear axle and housing therefor and a transmission shaft projecting forwardly from said axle housing, of an auxiliary frame pivotally connected with said main frame in front of said shaft for movement in a vertical plane and projecting in the rear of said axle and lying at a substantial distance above said axle, an axle and traction wheels for said auxiliary frame, said auxiliary frame tilting on said traction wheels and axle with the depression of said main frame, and an oscillating connection between said auxiliary frame and said rear axle.

9. The combination, with a main frame, a rear axle and housing therefor and a transmission shaft projecting forwardly from said axle housing, of an auxiliary frame pivotally connected with said main frame in front of said shaft and projecting in the rear of said rear axle, an axle and traction wheels for said auxiliary frame, said auxiliary frame tilting on said traction wheels and axle with the depression of said main frame and axle, and hangers mounted on said auxiliary frame and connected with said rear axle for oscillation thereon.

In witness whereof, we have hereunto set our hands this 22nd day of June, 1916.

EDWIN G. STAUDE.
VITUS A. BOKER.